Jan. 27, 1959 R. M. COMBS 2,870,501
LINERS FOR HOSE CLAMPS
Filed Nov. 23, 1956
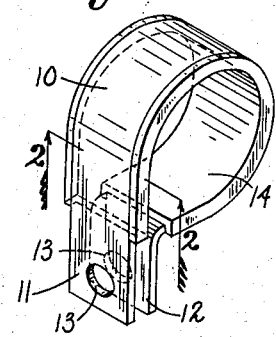
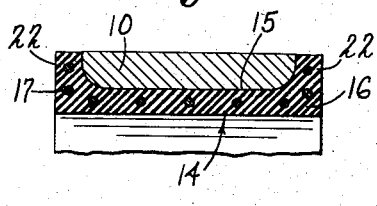
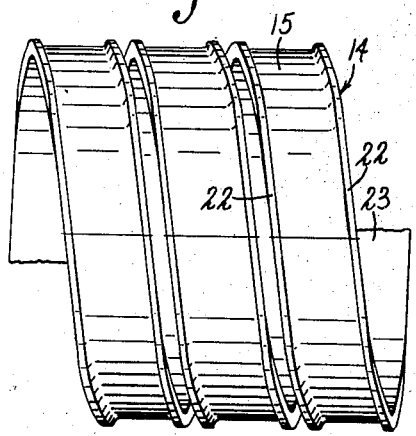
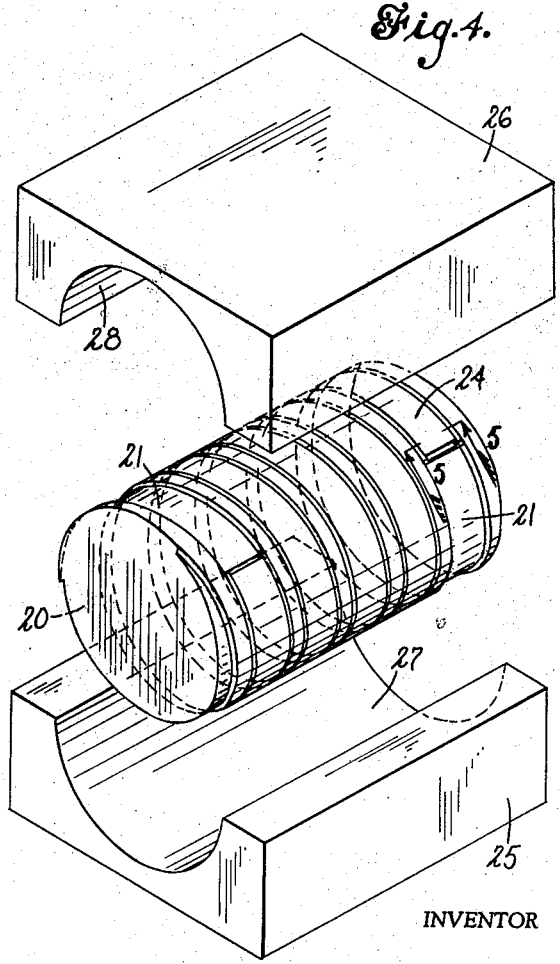
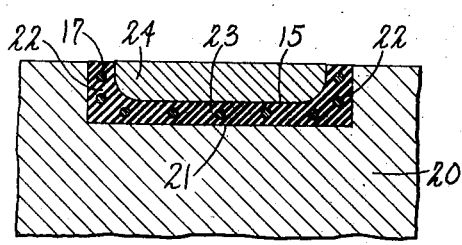
INVENTOR
Raymond M. Combs
BY
Rockmill Bartholow
ATTORNEYS

United States Patent Office 2,870,501
Patented Jan. 27, 1959

2,870,501

LINERS FOR HOSE CLAMPS

Raymond M. Combs, Cheshire, Conn., assignor to The Joclin Manufacturing Company, North Haven, Conn., a corporation of Connecticut Application November 23, 1956, Serial No. 624,020

10 Claims. (Cl. 24—16)

This invention relates to a liner for hose clamps or the like, and a method of making the same, and more particularly to a resilient liner of chemically inert and noncorrosive material designed to be used within a metal clamp, usually in the form of a band which is employed to bind or clamp a hose to a nipple or other fitting.

In the use of a metal hose clamp to clamp a hose to a fitting, a liner is some times employed within the clamp to lie adjacent the hose. Such a liner prevents the cutting of the hose by the clamp and should, if usable under all conditions, be of a chemically inert material, should be resilient so that it may be readily clamped about the hose, and should be heat resistant in applications where it is required that it withstand a considerable degree of heat.

Such liners are some times made in flat or straight strips but it has been found that when the liner is placed in the clamp, and particularly a clamp of small diameter, the bending of the tape liner into circular or arcuate form will be sufficiently sharp as to cause the liner to fracture, and the result is that it will soon fray and become useless. This is particularly true where the liner is made of material which is relatively hard or brittle.

It is contemplated by the present invention to make such a liner of material which will be wear- and heat-resistant, chemically inert, and of sufficient resilience to be bent upon the required radius without danger of fracture. According to one form of the invention the liner is made of a length of asbestos tape reinforced with wire which may be in the form of a number of straight wires or a wire mesh. Such a tape is impregnated with an aqueous dispersion of Teflon (polytetrafluoroethylene) so as to render it heat resistant and to impart to it the other desirable qualities required for such an element.

After impregnation, the tape is subjected to a certain amount of heat and pressure to give it a preformed channel shape in cross section, the heat employed, however, only being sufficient to enable it to hold its form and not sufficient to completely cure the Teflon.

It may then be formed into a helix or spiral and completely cured as it has been found that when given a spiral form the resulting liner can be cut into suitable lengths and bent over a relatively small radius without fracture. For example, it has been found that when this tape liner is made in a coil or helix of one inch diameter, it can be employed for liners of clamps from one-half inch to one and one-half inches in diameter and will readily conform to the curvature of such clamps. The liner is made in any desired lengths in this helical or spiral form, and when its use is desired, a suitable length is cut from the spiral.

One object of the present invention is to provide a new and improved liner for hose clamps or the like.

A further object of the invention is to provide a spiral or helix of material for use as a liner for hose clamps or the like, which spiral may be cut into the desired lengths and employed as a liner for hose clamps of varied diameters.

A further object of the invention is to provide a new and improved method for manufacturing hose clamps.

Still another object of the invention is to provide a new and improved method for manufacturing a relatively long length of material of spiral or helical form which may be employed as a liner for hose clamps or the like, the length of material being suitable when cut into relatively short strips for use with hose clamps of a diameter differing significantly from that of the spiral itself.

A still further object of the invention is to provide a liner for hose clamps or the like, the liner comprising a length or strip of a fibrous material impregnated with a moldable thermosetting substance which, when cured, will impart to the fibrous body characteristics of heat resistance, toughness, flexibility, resilience, and will provide a surface coating which will be substantially chemically inert, noncorrosive, friction free, nonsticky and self-lubricating.

To these and other ends the invention consists in the novel features and combinations of parts to be hereinafter described and claimed.

In the accompanying drawings:

Fig. 1 is a perspective view of a hose clamp having my improved liner applied thereto;

Fig. 2 is a sectional view on line 2—2 of Fig. 1;

Fig. 3 is an enlarged view of a length of material in spiral form which may be cut into desired lengths for use as liners for hose clamps;

Fig. 4 is an exploded view of the apparatus used in the process of manufacturing the liner material; and Fig. 5 is a sectional view on line 5—5 of Fig. 4.

There is shown in Figs. 1 and 2 of the drawings a hose clamp comprising a metal band 10 of substantially circular form, the band being provided with abutting end portions 11 and 12 which may be clamped together by a suitable bolt passed through openings 13 in the end portions so that the band may be drawn tightly about a hose after the latter has been placed upon a nipple or fitting. Within the band 10 of the clamp is employed a liner designated by the numeral 14.

As shown in the sectional view of Fig. 2, this liner is of U-shaped form in cross section, thus presenting a channel 15 in which the metal band 10 of the clamp is disposed. Also, as shown in Fig. 2, the liner consists of Teflon-impregnated asbestos material 16 having therein reinforcing wires 17, although the latter may be omitted if the material of the liner tape is sufficiently strong for the particular use to which it is to be put without any reinforcement. It will, of course, be apparent that the liner lies within the band 10 of the clamp and, therefore, abuts against the material of the hose with which it is employed.

As previously stated one of the objects of the invention is to provide the liner material in a relatively long length of material in spiral form, and in so doing the impregnated reinforced asbestos tape is preformed into its U-shaped or channel-shaped form and thereafter wound into a spiral or helix and completely cured in this form.

In producing the length of liner material so formed, a suitable length of asbestos tape having the wire reinforcement is dipped in an aqueous dispersion of Teflon so that it is thoroughly impregnated and then allowed to dry. It is then preformed into the desired cross-sectional shape, that is in U shape or channel-shaped form in cross section, by applying a certain amount of pressure and heat thereto. Care should be taken that sufficient heat is not applied to completely cure the Teflon at this time. Usually it is subjected to heat at 300° F. or less, as this will be sufficient to cause it to maintain its channel-shaped form when released from the pressure necessary to shape it into such form.

The tape is now in a straight strip of channel-shaped form, and it is wound on a mandrel having a spiral or helical groove therein such, for example, as the mandrel 20 shown in Fig. 4, having the spiral groove 21 cut in the surface thereof. The tape lies in this spiral groove which is of a depth substantially equal to the side flanges 22 of the strip (Fig. 5) with the web portion 23 of the tape being disposed at the bottom of the groove.

The diameter of the mandrel which is of generally cylindrical form will, of course, depend upon the diameter of the spiral to be made, and this in turn will depend to some extent upon the diameter of the clamp with which the liner is to be used although as previously stated a length of material cut from a spiral of given diameter may be used with clamps of both larger and smaller diameters.

A metal strip in the form of a coil or spring 24 may then be wound into the channel 15 of the tape, this strip being of substantially the same thickness as the band 10 so that it will fill the channel and hold the tape in place by its resilience. As the groove 21 is of spiral form, the spring may be turned or rotated, and it will wind itself into the channel of the liner along the complete length of the same.

The mandrel with the tape thereon may then be placed into a female metal mold, the two halves of which are shown at 25 and 26 (Fig. 4), these two mold parts having cooperating cavities 27 and 28 to snugly house the mandrel 20. The mold is closed and heat and pressure is applied until the Teflon is thoroughly sintered. The applied heat may be at a temperature of from 600 to 700° F., and the clamping pressure applied to the mold parts may be from 150 to 500 pounds per square inch.

After the curing of the liner the mold can be opened and the liner removed from the mandrel. It can then be cut into the desired lengths depending upon the diameter of the clamp with which it is to be employed.

When placing the liner material in the groove 21 of the mandrel 23, it may be desirable to clamp one end thereof to the mandrel while wrapping the remainder about the mandrel in the groove. After the helical spring has been turned onto the mandrel over the liner tape, the clamps may then be removed before the mandrel is placed in the mold.

If it is desired to employ a continuous process, the mandrel may be rotated by suitable mechanism and the tape 14 and spring 24 fed into the mold continuously. It will be noted that the spiral groove 21 in the mandrel is extended to the end faces thereof which will permit such an operation. In this way the resulting completed liner tape may be continuously made and fed from the mold.

The impregnation of a fibrous tape with polytetrafluoroethylene provides a clamp liner having many desirable characteristics. The asbestos itself is, of course, heat resistant but is subject to obvious disadvantages including its resistance to wear. Its impregnation gives the asbestos a coating and texture which has many advantages in the present application. For example, polytetrafluoroethylene is a moldable thermosetting material which will maintain its shape but which is flexible and resilient and possesses the quality of toughness to a high degree. It is heat resistant, being able to withstand heat of 500° F. and is chemically inert, non-corrosive and self-extinguishing after being subjected to flame. Moreover, it presents a surface which is nonsticky, friction free and self-lubricating.

Other substances having such characteristics may also be employed as an impregnating agent. One of such other substances, for example, might be polytrifluorochloroethylene (Kel–F) which possesses many of the same properties although it is less heat resistant than polytetrafluoroethylene and its use in this respect would be somewhat more limited.

While there is shown and described a preferred embodiment of the invention and one method of making the same, it will be understood that the invention is not to be limited to all of the details shown, but is capable of modification and variation within the spirit of the invention and within the scope of the claims.

What I claim is:

1. A strip of material of channel-shaped form in cross section and of helical form longitudinally for use as a clamp liner or the like comprising a length of fibrous material impregnated with a tough, flexible, thermosetting, heat-resistant, moldable material, said strip having a substantially chemically inert, noncorrosive surface coating.

2. A strip of material for use as a liner for a hose clamp comprising a length of fibrous tape impregnated with a thermosetting moldable material and molded into channel-shaped form in cross section, said strip being flexible and resilient and having a tough, heat-resistant, chemically inert, noncorrosive surface provided by the impregnating material, and being of helical form longitudinally.

3. A strip of material for use as a liner for a hose clamp comprising a length of asbestos tape impregnated with polytetrafluoroethylene and molded into a helix of spaced convolutions, and channel-shaped form in cross section, said strip being flexible and having a substantially friction-free, heat-resistant surface.

4. A strip of material as in claim 3 wherein the asbestos tape is provided with metallic reinforcement.

5. The method of making material for use as a liner for a hose clamp or the like which comprises impregnating a strip of fibrous tape with a moldable, thermosetting, heat-resistant material, molding said strip into a helix having a channel-shaped form in cross section, with each convolution being separate from an adjacent convolution and then applying heat to the impregnated strip to effect the setting thereof in helical form.

6. The method of making material for use as a liner for a hose clamp or the like comprising impregnating a strip of fibrous tape with a moldable, thermosetting, heat-resistant material, preshaping said strip, under heat and pressure, into channel-shaped form in cross section, molding the strip so shaped into helical form longitudinally, and curing the moldable material by the application of heat to effect setting of the strip in helical form.

7. The method according to claim 6 wherein the impregnating moldable, thermosetting, heat-resistant material is polytetrafluoroethylene.

8. The method of making material for use as a liner for a hose clamp or the like comprising impregnating a strip of fibrous tape with a moldable, thermosetting, heat-resistant material, preshaping said strip, under heat and pressure into channel-shaped form in cross section, wrapping said shaped strip in the grooves of a helically grooved mandrel, introducing the mandrel into a mold, and applying heat and pressure to the strip on the mandrel to mold it into helical form and cure the impregnating material.

9. The method as set forth in claim 8 wherein the impregnating material is polytetrafluoroethylene.

10. The method set forth in claim 5 wherein the strip of fibrous tape is of reinforced asbestos material, and the impregnating material is polytetrafluoroethylene.

References Cited in the file of this patent

UNITED STATES PATENTS

| | | |
|---|---|---|
| 2,331,098 | White et al. | Oct. 5, 1943 |
| 2,403,674 | Miller et al. | July 9, 1946 |
| 2,739,350 | Lampman | Mar. 27, 1956 |